United States Patent
Hu et al.

(10) Patent No.: US 8,527,487 B2
(45) Date of Patent: Sep. 3, 2013

(54) METHOD AND SYSTEM FOR AUTOMATIC CONSTRUCTION OF INFORMATION ORGANIZATION STRUCTURE FOR RELATED INFORMATION BROWSING

(75) Inventors: Changjian Hu, Beijing (CN); Kai Zhao, Beijing (CN); Min Zhao, Beijing (CN); Likun Qiu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 661 days.

(21) Appl. No.: 12/619,096

(22) Filed: Nov. 16, 2009

(65) Prior Publication Data
US 2010/0131485 A1 May 27, 2010

(30) Foreign Application Priority Data
Nov. 19, 2008 (CN) .......................... 2008 1 0177048

(51) Int. Cl.
G06F 17/30 (2006.01)
(52) U.S. Cl.
USPC ..... 707/706; 707/723; 707/769; 707/E17.109
(58) Field of Classification Search
None
See application file for complete search history.

(56) References Cited

U.S. PATENT DOCUMENTS

| | | | |
|---|---|---|---|
| 2005/0138556 A1* | 6/2005 | Brun et al. | 715/536 |
| 2005/0165753 A1* | 7/2005 | Chen et al. | 707/3 |
| 2007/0033166 A1* | 2/2007 | Trowbridge et al. | 707/3 |
| 2008/0205773 A1* | 8/2008 | Ma et al. | 382/225 |

FOREIGN PATENT DOCUMENTS
CN 1645370 A 7/2005

OTHER PUBLICATIONS

Poesio et al., ELERFED: Final Report, Institute for Computer Linguistics, University of Heidelberg, Jul. 2008.*
Office Action, dated Feb. 26, 2013, issued by the State Intellectual Property Office of the People's Republic of China in counterpart Chinese Application No. 200810177048.4.

* cited by examiner

*Primary Examiner* — Anteneh Girma
(74) *Attorney, Agent, or Firm* — Sughrue Mion, PLLC

(57) ABSTRACT

The present invention provides a method and system for automatic construction of information organization structure for related information browsing. The method comprises: inputting a target entity; retrieving information objects related to the target entity from an information object set; extracting topics related to the target entity; searching an existing structure resource to identify existing structures and entities which are relevant to the target entity based on the extracted topics; and selecting a matched structure, which is used for organizing the retrieved information objects related to the target entity, from the identified existing structures by comparing the target entity with each of the identified entities. Compared with the prior arts, the present invention can largely improve the readability of the relevant generated information organization structure.

21 Claims, 7 Drawing Sheets

METHOD AND SYSTEM FOR AUTOMATIC CONSTRUCTION OF INFORMATION ORGANIZATION STRUCTURE FOR RELATED INFORMATION BROWSING

FIELD OF THE INVENTION

The present invention generally relates to information organization. More specifically, the present invention relates to method and system for automatic construction of an information organization structure for related information browsing.

BACKGROUND

With fast development of network information technologies, there have more and more technologies and tools relevant to data mining. A common user could collect lots of information, which he/she is interested in, and the collected information could be relevant to some special entities (e.g. query items).

With respect to the collected information set, a user may have two basic requirements. One is to locate some piece of information, which he/she is looking for. And the other is to browse all the content covered by the whole information set and to do deeper analyzing. The former requirement is called as "information retrieval requirement", while the latter one is called as "information organization requirement".

Some search engine can be applied on the information set, and can be a good tool to meet the information retrieval requirement. However, for the information organization requirement, the search results list provided by the search engine cannot work effectively, because reading the whole list and generating an organization method by human may take lots of time and human labor. To help the user easily browse the collected information set, firstly, an effective organization structure for the information set should be built. Since a generated information organization structure with good readability can help user easily understand and quickly navigate to the information he/she is interested in, and bring the user much better experience, how to construct a good organization structure for the collected information set becomes a general problem.

Usually, traditional methods for building an information organization structure automatically extract elements from the information set and build the structure according to the relationship among the elements in the information set. For example, the US patent application No. 2006/0026190A1, entitled "System and Method for Category Organization" and filed on Jul. 30, 2004, proposes a method to automatically discover category for a collected document set. The disclosure of the US application is hereby incorporated entirely by reference for all purposes. The method firstly generates a list of top N (i.e. N=50) most frequently occurring terms in the document collection. Secondly, a bit vector matrix (size N*M) for the list will be created. For each term in the list, a term bit vector, whose length equals to the number (M) of documents in the document collection, can be generated based on the status whether the documents contain the term or not. Thirdly, all predictive relations among all term bit vectors will be generated based on the bit vector matrix, and stored in the term prediction matrix which is a Bi-Normal separation Matrix of size N*N. Fourthly, negative and positive pair list will be determined based on the prediction matrix. And finally a structure will be constructed by the predefined procedures. For example, FIG. 1 shows an example of the information organization structures generated by this method.

With reference to the example of FIG. 1, it can be seen that the built structure according to the existing method of FIG. 1 is usually not satisfied because it does not have a good readability. In details, the various categories on the generated structure tend to be less meaningful, e.g. it may not be so easy for common user to understand what "not-battery-will-charge", "screen", "screen-dim" mean in FIG. 1. In addition, in some situations, the generated category trees are less reasonable. For example, there are two parallel root nodes generated in the example of FIG. 1, i.e. "main" and "main2", thereby leading to some difficulty in navigating or browsing the related document set.

SUMMARY OF THE INVENTION

The present invention is made in consideration of the above-mentioned problems existing in the prior arts. In particular, the present invention provides a method and system for automatically constructing an information organization structure for entity related information. Compared with the prior arts, the present invention can largely improve the readability of the relevant generated information organization structure.

According to the first aspect of the invention, it is provided a method for automatic construction of information organization structure, comprising: inputting a target entity; retrieving information objects related to the target entity from an information object set; extracting topics related to the target entity; searching an existing structure resource to identify existing structures and entities which are relevant to the target entity based on the extracted topics; and selecting a matched structure, which is used for organizing the retrieved information objects related to the target entity, from the identified existing structures by comparing the target entity with each of the identified entities.

According to the second aspect of the invention, it is provided a system for automatic construction of information organization structure, comprising: an input means for inputting a target entity; an information object retrieving means for retrieving information objects related to the target entity from an information object set; a topic extraction means for extracting topics related to the target entity; an existing structure identification means for searching an existing structure resource to identify existing structures and entities which are relevant to the target entity based on the extracted topics; and a matched structure obtaining means for selecting a matched structure, which is used for organizing the retrieved information objects related to the target entity, from the identified existing structures by comparing the target entity with each of the identified entities.

With continuous accumulation of network information, there are lots of knowledge resources for elaborating specific entities (such as wikipedia, Baidu Baike, etc.). For example, http://www.chinahbj.com is such a website for introducing and talking about Chinese tea. There have already been lots of existing structures in these knowledge resources or websites, which could be borrowed and updated for organizing other entities. With the method of the present invention, a suitable information organization structure with good readability could be built by referring to these existing structures. More specifically, the advantages of the present invention can be embodied from at least the following two aspects.

First, the nodes of the structures generated by the invention are generally phrases or simple sentences. The content is denser, and thus easier for human to understand. For example, "without rechargeable battery pack" could be easier for human to understand than "not-battery-will-charge". Obviously, the readability of this kind of nodes is better than that of nodes automatically generated from the documents.

Second, the system of the present invention can incrementally improve the existed structure by mining as many as possible similar structures and considering the assigned documents, and then build a more complete and suitable structure for a given entity. For example, assume there has already existed several websites talking different kinds of Chinese teas (e.g. green tea, red tea, etc.). From these websites, a plurality of structures used to organize the known kinds of Chinese teas (e.g. green tea and red tea) could be extracted, and the related nodes of the structures can be called as "information categories" for elaborating the various aspects of the related Chinese tea, such as general knowledge, variety, competitive products, efficacy, identifying, and the like. It must be very complete to describe a new Chinese tea, for example mum tea, from all known aspects. Moreover, it must be suitable to further tune and improve the generated information organization structure by removing the aspects with less information (e.g., "identifying" category for Mum tea), and discovering more detailed sub-categories for some aspects (categories) with so many information items (e.g., splitting "efficacy" for Mum into sub-categories "health protection", "medical treatment" and "nutrition value").

The foregoing and other features and advantages of the present invention can become more obvious from the following description in combination with the accompanying drawings. Please note that the scope of the present invention is not limited to the examples or specific embodiments described herein.

BRIEF DESCRIPTIONS OF THE DRAWINGS

The foregoing and other features of this invention may be more fully understandable from the following description, when reading together with the accompanying drawings in which.

DETAILED DESCRIPTION OF THE PREFERRED EMBODIMENTS

Below the exemplified embodiments of the present invention will be described with reference to the accompanying drawings. It should be noted that the described embodiments are only used for the purpose of illustration, and the present invention is not limited to any of the specific embodiments described herein.

Figure 2:
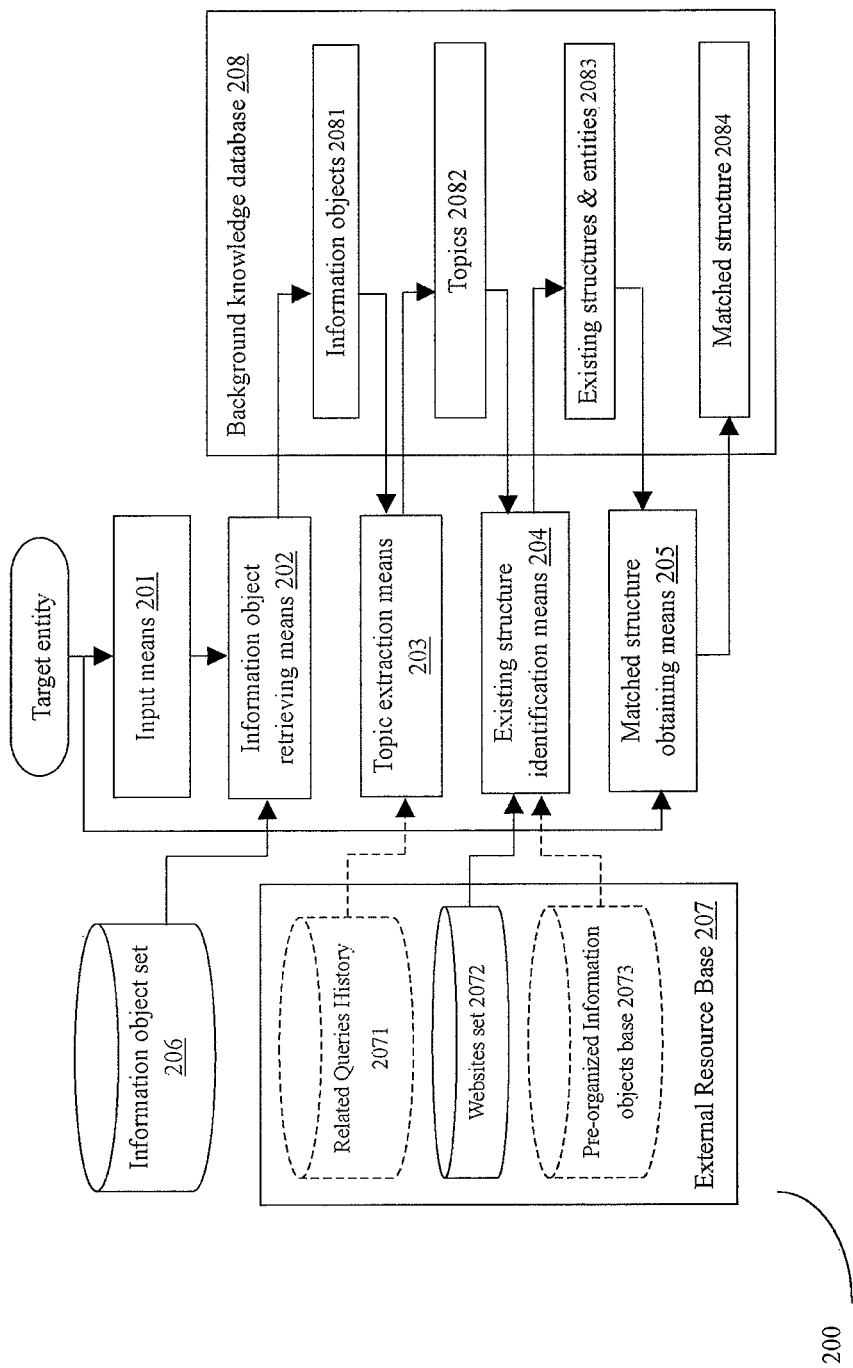
FIG. 2 is a structural block diagram for showing an automatic information organization structure construction system 200 according to the first embodiment of the present invention.

FIG. 2 is a structural block diagram for showing an automatic information organization structure construction system 200 according to the first embodiment of the present invention. As shown, the system 200 includes mainly an input means 201, an information object retrieving means 202, a topic extraction means 203, an existing structure identification means 204 and a matched structure obtaining means 205. In addition, to facilitate the operations of the system modules, the system 200 also comprises an information object set 206, an external resource base 207 and a background knowledge database 208. In the system shown in FIG. 2, a user can first input a suitable target entity through the input means 201. The so-called "entity" can be a subject matter to describe what the information set the user is interested in is talking about, but it can be expanded to a subject matter reflected by the return results of a query that the user inputs. For example, in the following description, the target entity can be "mum tea", "software" or other items which the user inputs and is interested in.

The target entity, which is inputted by the user through the input means 201, can then be provided to the information object retrieving means 202. The information object retrieving means 202 utilizes the target entity to search the information object set 206, retrieves information objects related to the target entity and stored the information objects in the background knowledge database 208 as information objects 2081. Then, under cooperation of external resources stored in the external resource base 207, the system 200 generates a suitable information organization structure by related topic extraction, existed structure identification, matched structure selection and other processes, for organizing information objects retrieved by the information object retrieving means 202, which are related to the target entity. The operation processes of respective internal components of the system 200 will be described in more details later.

Figure 3:
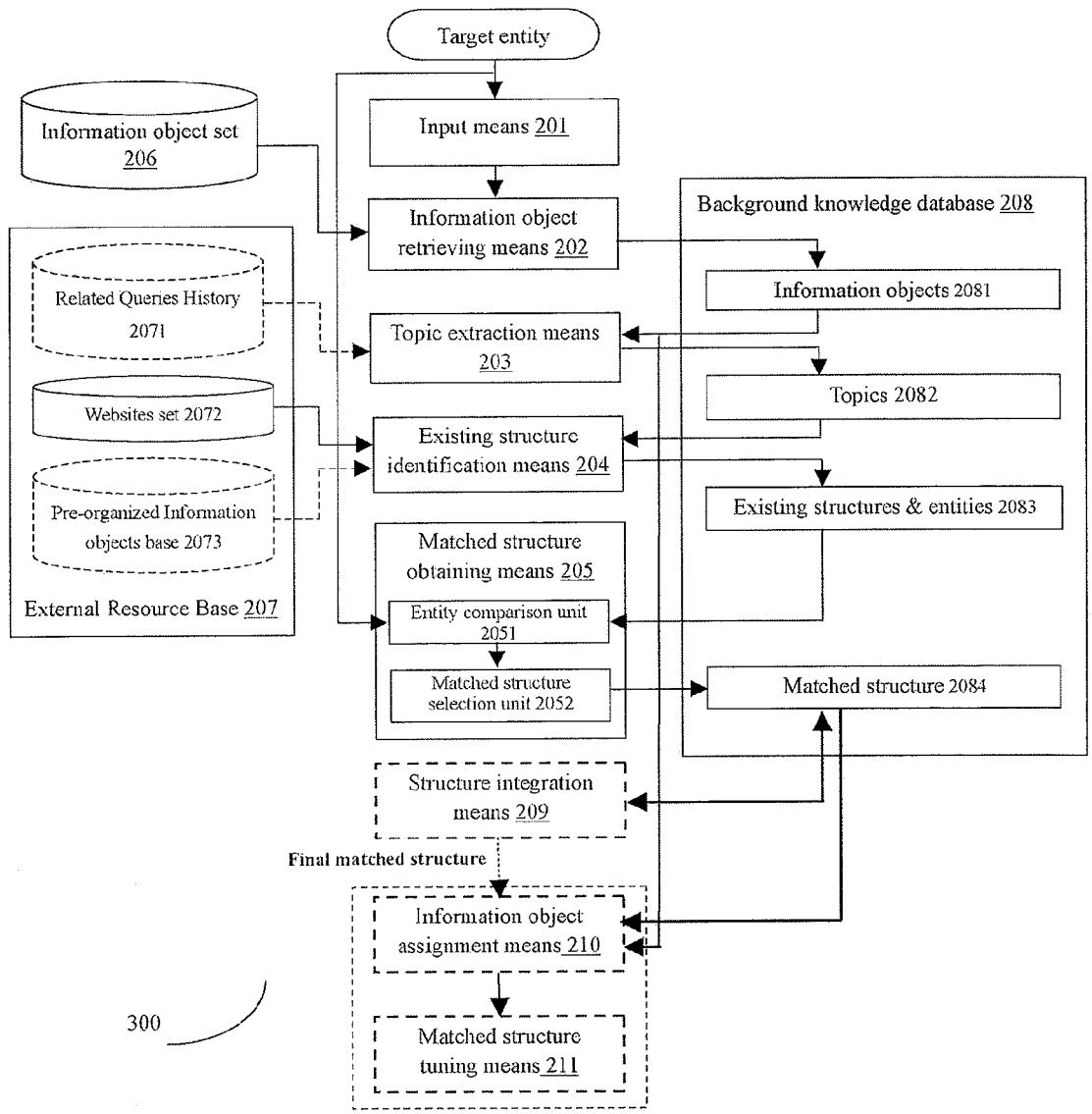
FIG. 3 is a structural block diagram for showing an automatic information organization structure construction system 300 according to the second embodiment of the present invention.

FIG. 3 is a structural block diagram for showing an automatic information organization structure construction system 300 according to the second embodiment of the present invention. Compared with the system 200 according to the first embodiment as shown in FIG. 2, the difference of the system 300 is that in addition to the necessary components included in the system 200, the system 300 further comprises a structure integration means 209, an information object assignment means 210 and a matched structure tuning means 211. In FIG. 3, these additional components are shown in form of broken line blocks. In addition, as an example, FIG. 3 also shows an example of the internal structure of the matched structure obtaining means 205, which includes an entity comparison unit 2051 and a matched structure selection unit 2052 in the example of FIG. 3. In a case that a plurality of matched information organization structures are generated by operation of the system according to the present invention, the structure integration means 209 can be used for integrating the generated structures to obtain a final structure for organizing the information objects. The information object assignment means 210 is used for assigning the retrieved information objects related to the target entity to different categories on the generated information organization structure. The matched structure tuning means 211 is used for adjusting (tuning) the generated information organization structure according to the assignment result of the information objects. The operation processes of respective additional components of the system 300 will be described in more details later.

Figure 4:
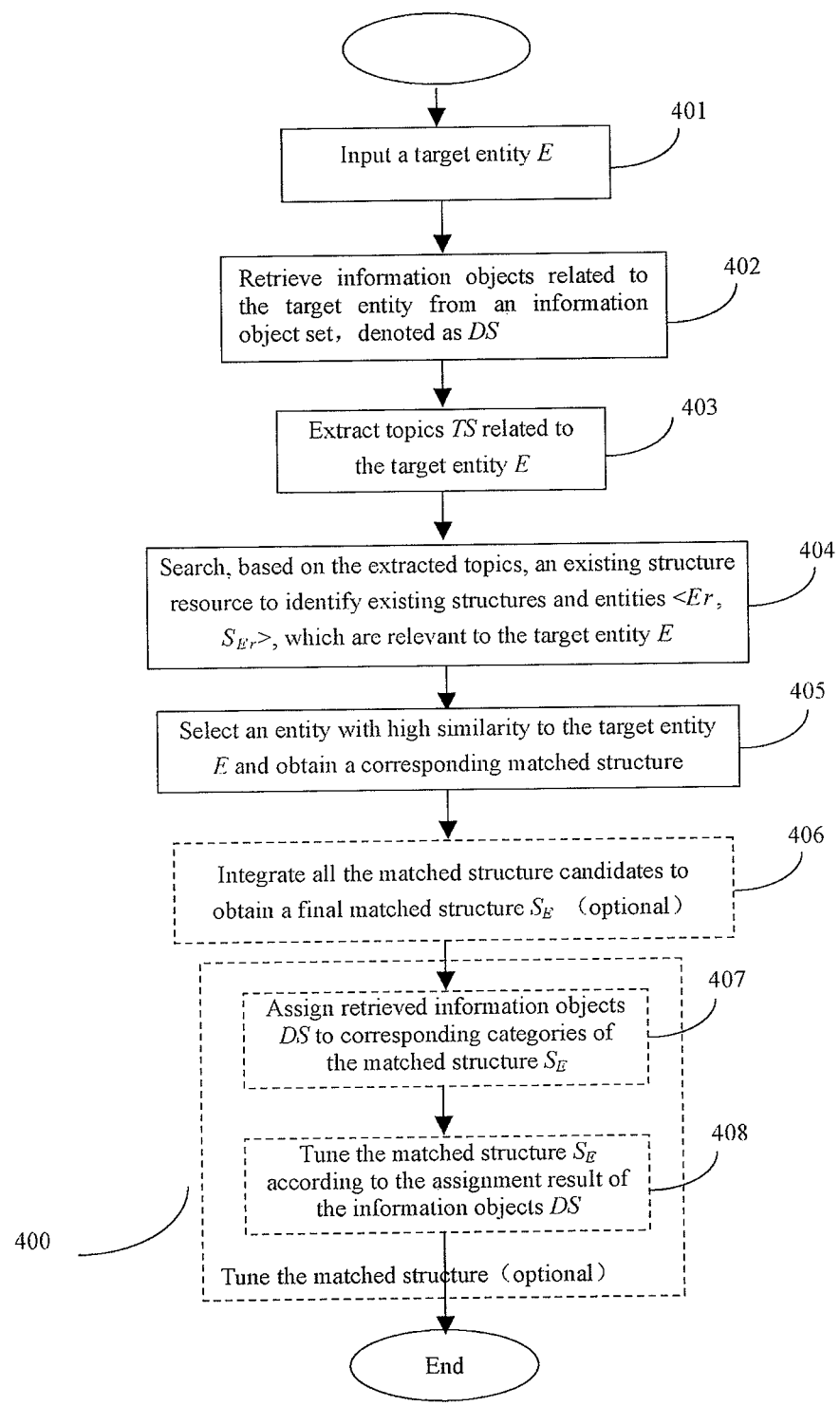
FIG. 4 is a flow chart for showing an example of the operation process of the system 300 shown in FIG. 3.

FIG. 4 is a flow chart for showing an example of the operation process of the system 300 shown in FIG. 3, in which the steps 401-405 correspond to the operation process of the system 200 according to the first embodiment, while steps 406-408, which are shown in broken line blocks, correspond to the operations of the additional components in the system 300, i.e. the structure integration means 209, the information object assignment means 210 and the matched structure tuning means 211. With reference to FIG. 4, first, in the step 401, the user can input a target entity E through the input means 201. The target entity E is for example "mum tea". Then, in the step 402, the information object retrieving means 202 retrieves, by some traditional method, information objects related to the target entity E from the information object set 206, denoted as DS, and stores the set of information objects DS in the background knowledge database 208 as information objects 2081. For example, the user can submit the target entity "mum tea" to a search engine or a document database to retrieve documents related to "mum tea" and stores the retrieved documents as information objects in the background knowledge database 208. In the background knowledge database 208, any simple data structure known by those skilled in the art can be used to store the retrieved information objects. For example, the data structure may include two fields, i.e. an Information Object ID and the information object itself. In the step 403, the topic extraction means 203 extracts a plurality of topics TS related to the target entity E directly from the set of retrieved information objects DS. Likewise, the extracted topics can be stored in the background knowledge database 208 as topics 2082. For example, the process of the topic extraction means 203 for extracting topics from the set of information objects can include the following steps: a) extract relevant phrases by word counting or directly text analyzing techniques, b) do clustering based on the phrases or their relations (measured based on the co-occurrence matrices). Obviously the step b) is optional. In another embodiment, the topic extraction means 203 may extracts relevant topics with reference to the related queries history 2071 in the external resource base 207. The related queries history 2071 can be from a certain search engine, such as the searching history of Baidu (www.baidu.com). For example, in the example of FIG. 5, as to the inputted target entity "mum tea", a list of topics as shown by reference number 501 can be obtained from the searching history of the search engine, which includes "efficacy of mum tea", "functions of mum tea" and many other relevant topics. Since the related queries history 2071 is usually represented in a form of phrases or simple sentences, it is easier to extract topics related to the target entity. Here, any traditional method well known by those skilled in the art can be applied to conduct the process of topic extraction.

Then, after extracting the topics related to the target entity, in the step 404, the existing structure identification means 204 can search, based on the extracted topics, an existing structure resource to identify existing structures and entities <Er, $S_{Er}$>, which are relevant to the target entity E, wherein Er represents related entities and $S_{Er}$ represents corresponding existing structures. The identified existing structures and entities are then stored in the background knowledge database 208 as existing structures & entities 2083. According to the embodiments of the present invention, the existing structure resource may be a set of websites from the Web, or a well-organized information object base. For example, in FIG. 3, the external resource base 207 is for example shown as including a websites set 2072 and a pre-organized information objects base 2073 as an example of the existing structure resource.

Figure 5:
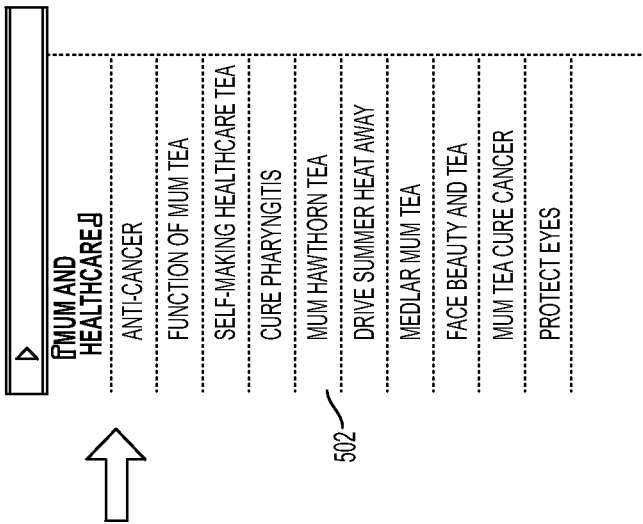
FIG. 5 is a schematic diagram for illustrating a topic extraction process and a existed structure identification process.

FIG. 5 shows a Web site used as an example of the existing structure resource. As shown in FIG. 5, the user can first generate a query based on the extracted topics. For example, in the list of topics shown in FIG. 5, a simple query "mum tea/efficacy/medicinal effects" can be established. Then, the query is submitted to a search engine to collect from the Web the URLs of related websites covering part of the topics. By analyzing each of the collected websites, the user may determine whether the website covers a part of the extracted topics and identify relevant existing structures and entities. For example, as shown in FIG. 5, according to the generated query, a relevant website "http://www.chinahbj.com" can be searched out, from which a related entity "hangbaiju" (a kind of mum tea) and an existing structure 502 can be identified.

In addition, if a pre-organized structure resource, such as the pre-organized information objects base 2073, has been existed in the external resource base 207, the user can obtain the information objects from the information objects base that cover a part of the extracted topics (or key phrases). For example, the information objects base may store a set of documents and the information objects obtained from that are usually index pages of the special document collections. Thus, the related existing structures and entities can also be extracted easily.

Next, in the step 405, the matched structure obtaining means 205 selects, from the identified entities in the step 404, entities with high similarity to the target entity and selects an existing structure corresponding to the selected entity as a matched structure for organizing the information objects related to the target entity. The extracted matched structure can then be stored in the background knowledge database 208 as matched structure 2084. The matched structure 2084 is later used for information organization and analysis. In the example of FIG. 3, the matched structure obtaining means 205 is shown as including an entity comparison unit 2051 and a matched structure selection unit 2052. In some examples, the entity comparison unit 2051 compares the inputted target entity with each identified entity, calculates the semantic similarity of their names, and chooses and stores the best matched ones, as the entities with high similarity to the target entity. In such a case, the entity comparison unit 2051 can use any traditional semantic similarity measurement method. According to the similarity score calculated by the entity comparison unit 2051 between the names of the target entity and each identified entity, the matched structure selection unit 2052 can select those entities having high similarly score, and extract corresponding existing structures as matched structures. For example, as to the target entity "mum tea", if the background knowledge database 208 has stored an identified entity "green tea", since the entity "green tea" is very similar to the target entity "mum tea" in the semantic level, the matched structure selection unit 2052 considers "green tea" matches the target entity "mum tea", and extracts an existing structure related to the entity "green tea" as the matched structure. Moreover, in other examples, the matched structure obtaining means 205 can find an entity with high similarly by calculating the numbers of similar topics covered by the information objects corresponding to the target entity and each identified entity, and use the existing structure of the entity as the matched structure.

Up to the step 405, the user has built a matched structure related to the target entity. That is, the operation of the system 200 shown in FIG. 2 according to the first embodiments of the present invention has finished. The generated matched structure can later be used for organizing the information objects related to the target entity.

As an expansion of the present invention, the system 300 of FIG. 3 further includes additional components: the structure integration means 209, the information object assignment means 210 and the matched structure tuning means 211. The structure integration means 209 can be configured for integrating multiple matched structure candidates, the information object assignment means 210 and the matched structure tuning means 211 can be configured for adjusting and tuning the final matched structure. The operations of these additional components are described in more details with reference to the steps 406-408 of FIG. 4.

As shown in FIG. 3, the integration and tuning of the matched structures are shown as two separate expansible modules. However, based on the user's requirement, any of the modules can be arranged separately or collaboratively.

1. Structure Integration Process

Figure 6:
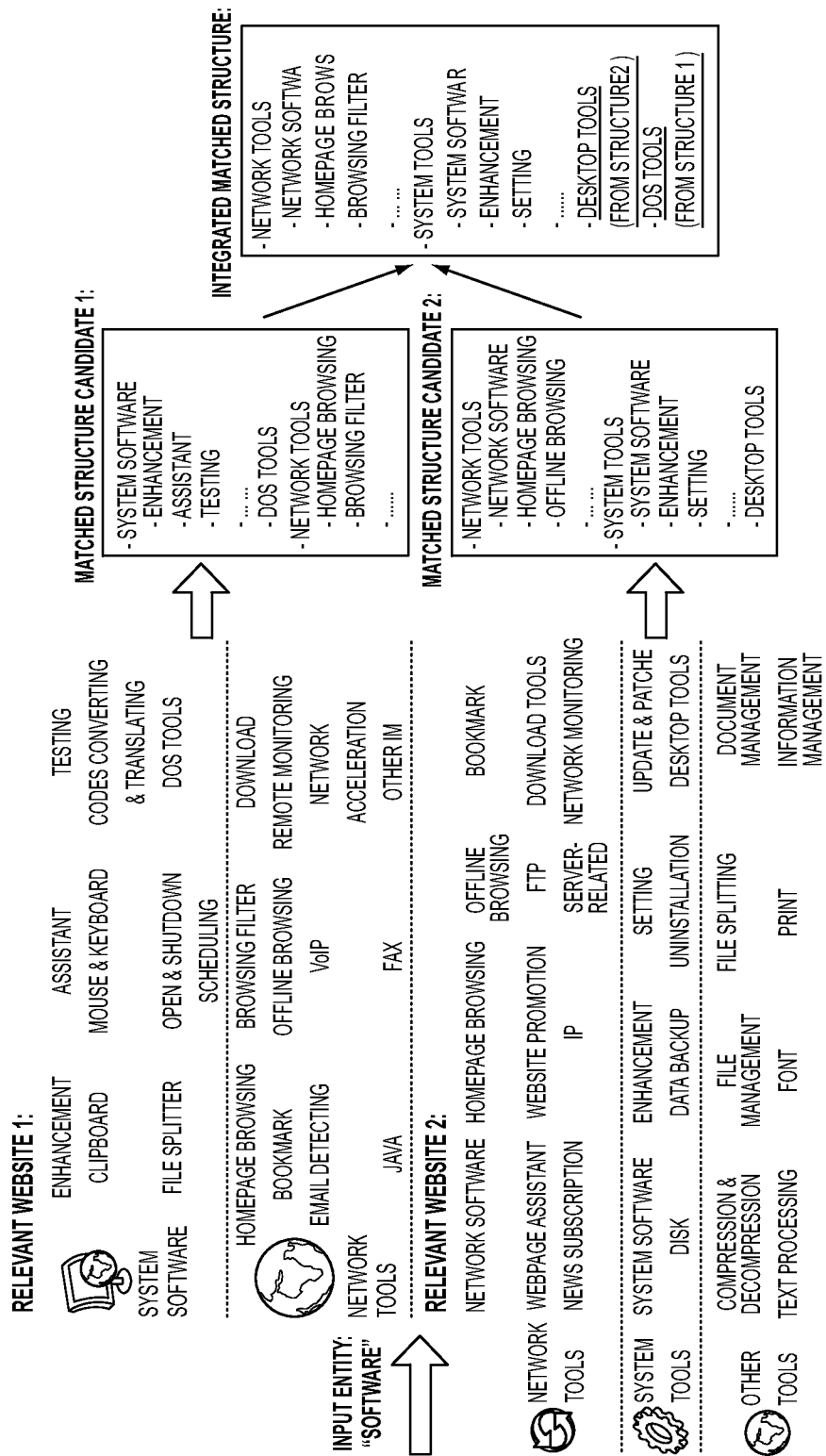
FIG. 6 is a schematic diagram for illustrating a structures integration process.

If the number of the matched structures identified by the matched structure obtaining means 205 from the existing structures is larger than 1, these structure candidates can be integrated by using the structure integration means 209 to generate a final matched structure (step 406). FIG. 6 shows an example of the structure integration process.

In the example of FIG. 6, for example, the inputted target entity is "software". Through topics extraction and searching the existing Web sites resource, assume that there are two relevant websites being searched out, i.e. the relevant website 1 and the relevant website 2 shown in FIG. 6. Then, the matched structure obtaining means 205 can identify respectively two matched structures from the relevant website 1 and the relevant website 2, i.e. the matched structure candidate 1 and the matched structure candidate 2. Both of the two matched structures can be used to organize the information objects related to the entity "software". The structure integration means 209 can then be used to generate a more complete integrated matched structure. As shown in FIG. 6, the integrated matched structure includes not only an information category "desktop tools" from the structure 2, but also an information category "DOS tools" from the structure 1.

2. Structure Tuning Process

The matched structure identified by the matched structure obtaining means 205 can also be provided to the information object assignment means 210 for organizing information objects. Then, the matched structure tuning means 211 can tune the matched structure according to the assignment result of the information objects. In addition, in a case that there are multiple matched structure candidates, it is preferable to first use the structure integration means 209 to integrate the multiple structural candidates to generate a final structure, and then provide the final structure to the information object assignment means 210 and the matched structure tuning means 211 for later information objects assignment and structure tuning.

Figure 7:
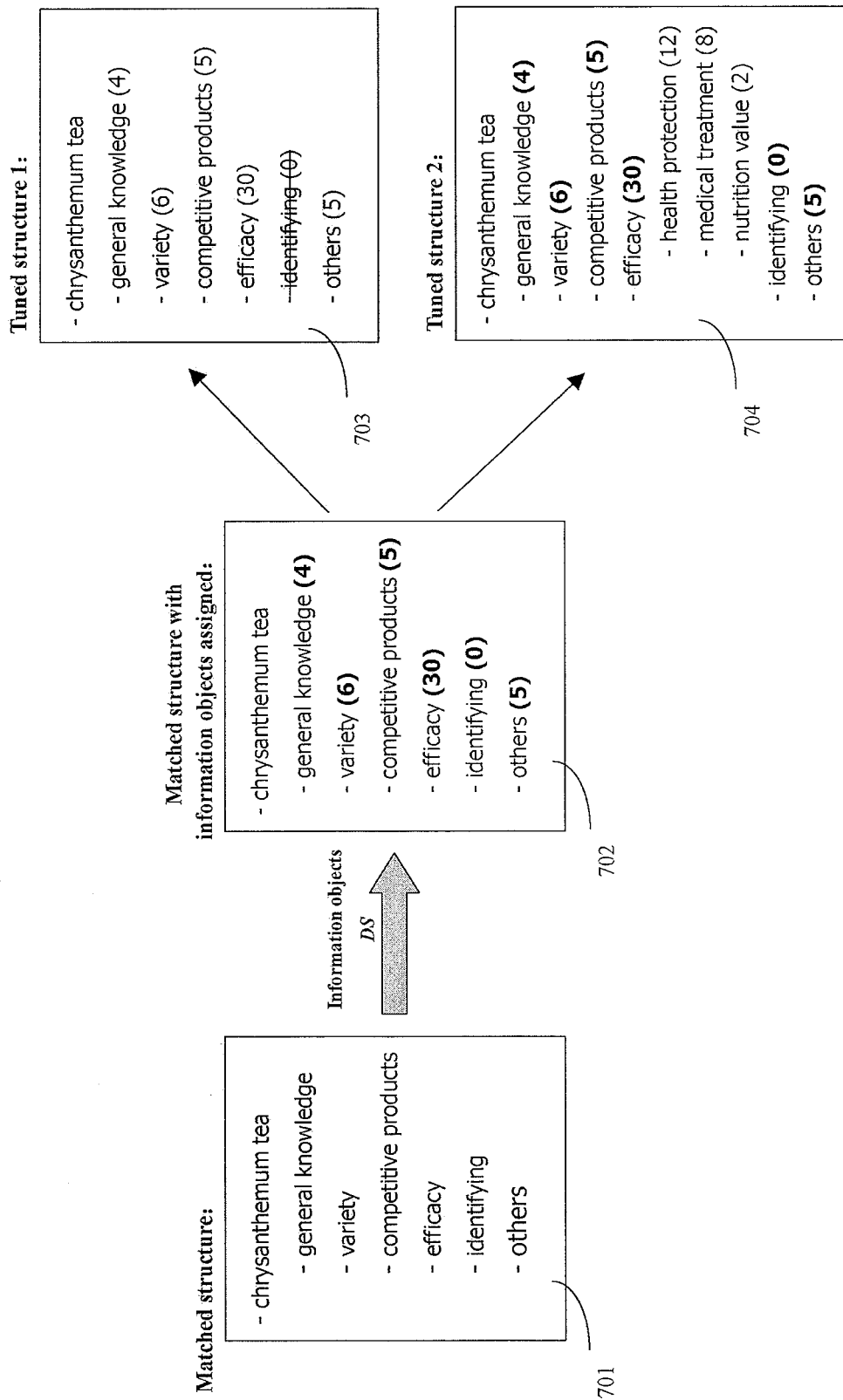
FIG. 7 is a schematic diagram for illustrating an information object assignment process and a structure tuning process.

Return to FIG. 4, in the step 407, the information object assignment means 210 can assign the retrieved information objects related to the target entity to the integrated matched structure. FIG. 7 shows an example of the information objects assignment process.

In the example of FIG. 7, assume that there are totally 50 information objects related to the target entity "mum tea", and the generated matched structure is as shown by 701. Through objects assignment, the 50 relevant information objects are assigned to different nodes (i.e. categories) on the selected matched structure. For example, as shown by the structure 702, the number of information objects assigned to the category "general knowledge" is 4, the number of information objects assigned to the category "variety" is 6, and so forth.

After assigning the information objects to the selected matched structure, the user can use the matched structure tuning means 211 to adjust the generated information organization structure according to the assignment result of the information objects (step 408). FIG. 7 also shows an example of the structure tuning process.

The adjustment of the selected matched structure can include for example two aspects. One is to delete some nodes (categories), which contain less number of information objects. The other is to refine some nodes, which contain too many information objects.

In the example of FIG. 7, since the number of information objects contained in the category "identifying" is less, for example, than a threshold (is 0 in the example of FIG. 7), this node (category) can be deleted from the selected structure. And the tuned structure 703 will be obtained. Because there may be no any information object in the set of information objects, which is related to the topic "identifying", the topic is meaningless to the entity "mum tea". In fact, it is easier for human to identify "mum tea" than identify "green tea", so this topic may be meaningless to "mum tea".

On the other hand, the category "efficacy" contains many (such as 30 in FIG. 7) information objects. Therefore, it is necessary to further refine the information objects in this node. That is, the user can establish some sub-categories with respect to this node by using certain existing automatic category generation technologies. For example, in the example of FIG. 7, the category "efficacy" is further divided into multiple sub-categories "health protection", "medical treatment" and "nutrition value", and the 30 information objects are further assigned respectively into an appropriate sub-category. By generating sub-categories, the user can be easier to browser the 30 information objects. Through the tuning operation of the matched structure tuning means 211, a final information organization structure is formed as shown by the structure 704 in FIG. 7, for example.

The structures and operation principles of the automatic information organization structure construction system 200 according to the present invention and its expansive system 300 have been described as above with reference to the accompanying drawings. It can be seen from the foregoing description that the information organization structure constructed according to the present invention has better user readability than that of the prior arts, and thus can organize the information objects in a more complete way.

The specific embodiments of the present invention have been described above with reference to the accompanying drawings. However, the present invention is not limited to the particular configuration and processing shown in the accompanying drawings. Furthermore, for the purpose of simplification, the description for those well-known methods or technologies is omitted here. In the embodiments, several specific steps are shown and described as examples. However, the method process of the present invention is not limited to these specific steps. Those skilled in the art will appreciate that these steps can be changed, modified and complemented or the order of some steps can be changed without departing from the spirit and substantive features of the invention.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine-readable medium or transmitted by a data signal embodied in a carrier wave over a transmission medium or communication link. The "machine-readable medium" may include any medium that can store or transfer information. Examples of a machine-readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as the Internet, Intranet, etc.

Although the invention has been described above with reference to particular embodiments, the invention is not limited to the above particular embodiments and the specific configurations shown in the drawings. For example, some components shown may be combined with each other as one component, or one component may be divided into several subcomponents, or any other known component may be added. The operation processes are also not limited to those shown in the examples. Those skilled in the art will appreciate that the invention may be implemented in other particular forms without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for automatic construction of information organization structure, comprising:
   inputting a search term;
   retrieving search results related to the search term;
   extracting from the search results topics related to the search term;
   searching a website related to the search term for topics related to the search term among the extracted topics to identify other websites related to the search term;
   selecting a matching website from the identified other websites by comparing the search term with each of the identified other websites; and
   setting a structure of the matching website as a structure for organizing the search results related to the search term.

2. The method according to claim 1, wherein the topics related to the search term, are extracted from a query log of a search engine.

3. The method according to claim 1, wherein the resource website related to the search term is a set of websites on the Internet, and the searching to identify the other websites comprises:
   generating queries based on the extracted topics related to the search term;
   submitting the queries to a search engine;
   collecting websites related to one or more of the extracted topics related to the search term; and
   extracting the other websites related to the search term by analyzing the collected websites.

4. The method according to claim 1, wherein the searching comprises:
   searching the a well-organized information object repository for topics related to the search term from among the extracted topics;
   obtaining, from the well-organized information object repository, information objects related to one or more of the extracted topics related to the search term; and
   identifying information objects from the obtained information objects related to the search term.

5. The method according to claim 1, wherein the selecting the matching website comprises:
   comparing the search term and each of the identified other websites; and
   choosing one of the other websites having the highest similarity to the search term as the matching website.

6. The method according to claim 5, wherein comparing comprises:
   calculating a semantic similarity score between names of the identified other websites and the search term.

7. The method according to claim 5, wherein the comparing comprises:
   calculating a number of same or similar topics shared by the search term and the identified other websites.

8. The method according to claim 1, wherein a plurality of matching website candidates are fetched from the identified other websites by comparing the search term with each of the identified other websites, and the method further comprises:
   integrating the plurality of matching website candidates to obtain a final matched structure.

9. The method according to claim 1, further comprising:
   assigning the search results to the categories of the structure of the matching website.

10. The method according to claim 9, further comprising:
    counting a number of the assigned search results in each of the categories of the structure of the matching website; and
    tuning the structure according to a result of the counting.

11. The method according to claim 10, wherein the tuning comprises at least one of:
    deleting a category in which the number of assigned search results is less than a first threshold; and
    generating more detailed sub-categories for a category in which the number of assigned search results is larger than a second threshold.

12. A system for automatic construction of information organization structure, comprising:
    a processor that controls the system to implement:
    an input that receives input of a search term;
    an object retrieving unit that retrieves search results related to the search term;
    a topic extraction unit that extracts topics related to the search term;
    an existing structure identification unit that searches a website related to the search term for topics related to the search term among the extracted topics to identify other websites related to the search term; and
    a matched structure obtaining unit that selects a matching website from the identified other websites by comparing the search term with each of the identified other websites and sets a structure of the matching website as a structure for organizing the search results related to the search term.

13. The system according to claim 12, wherein the website related to the search term is a set of websites on the Internet, and the existing structure identification means is configured to generate queries based on the extracted topics related to the search term, submit the queries to a search engine, collect websites related to one or more of the extracted topics related to the search term, and extract other websites related to the search term by analyzing the collected websites.

14. The system according to claim 12, wherein the existing structure identification means is configured to search a well-organized information object repository for topics related to the search term from among the extracted topics, obtain, from the well-organized information object repository, information objects related to one or more of the extracted topics related to the search term, identify information objects from the obtained information objects related to the search term.

15. The system according to claim 12, wherein the matched structure obtaining unit comprises:
    an entity comparison unit that compares the search term and each of the identified other websites; and a matched structure selection unit that selects one of the other websites having the highest similarity to the search term as the matching website.

16. The system according to claim 15, wherein the entity comparison unit is configured to calculate a semantic similarity score between names of the identified other websites and the search term.

17. The system according to claim 15, wherein the entity comparison unit is configured to calculate a number of same or similar topics shared by the search term and the identified other websites.

18. The system according to claim 12, wherein the matched structure obtaining unit obtains a plurality of matching website candidates from the identified other websites by comparing the search term with each of the identified other websites, and the system further comprises:
a structure integration that integrates the plurality of matching website candidates to obtain a final matched structure.

19. The system according to claim 12, further compromising:
an information object assignment unit that assigns the search results to the categories of the structure of the matching website.

20. The system according to claim according to claim 19, further comprising:
a matched structure tuning unit that tunes the matched structure,
wherein the matched structure tuning unit comprises:
a counting unit that counts a number of the assigned search results in each of the categories of the structure of the matching website; and
a tuning unit that tunes the structure according to a result of the counting unit.

21. The system according to claim 20, wherein the tuning unit tunes the structure by at least one of:
deleting a category in which the number of assigned search results is less than a first threshold; and
generating more detailed sub-categories for a category in which the number of assigned search results is larger than a second threshold.

* * * * *

UNITED STATES PATENT AND TRADEMARK OFFICE
CERTIFICATE OF CORRECTION

PATENT NO. : 8,527,487 B2  Page 1 of 1
APPLICATION NO. : 12/619096
DATED : September 3, 2013
INVENTOR(S) : Changjian Hu et al.

Figure 1:
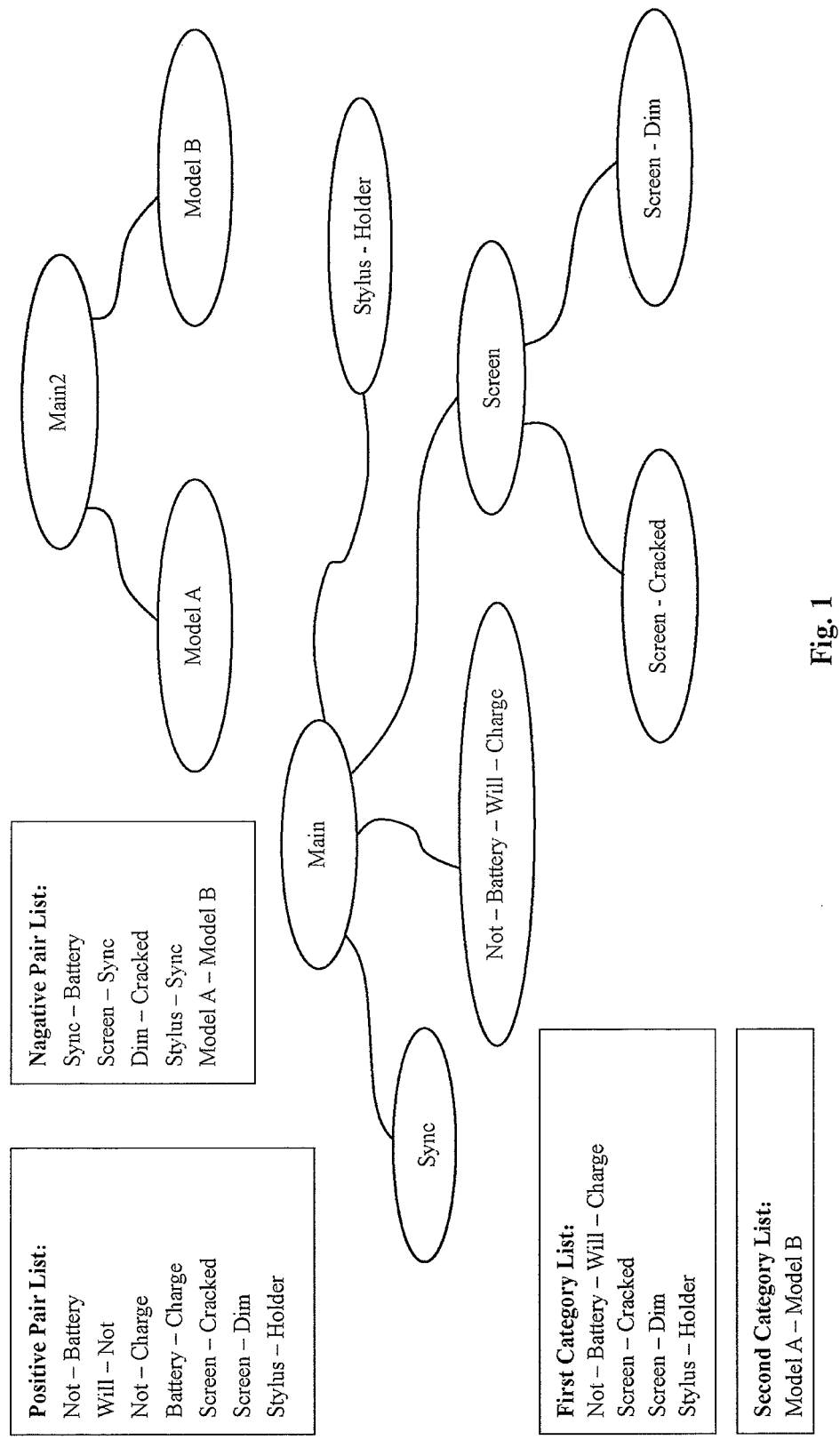
FIG. 1 is a schematic diagram for showing an example of an information organization structure built by using a prior art.

It is certified that error appears in the above-identified patent and that said Letters Patent is hereby corrected as shown below:

In the Drawings
Drawing Sheet 1 of 7 - Fig. 1: Delete "Nagative" and insert -- Negative --

Drawing Sheet 4 of 7 - Fig. 4: Delete " 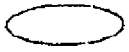 " and insert -- 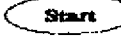 --
Drawing Sheet 6 of 7 - Fig. 6: Delete "SOFTWA" and insert -- SOFTWARE --
Drawing Sheet 6 of 7 - Fig. 6: Delete "BROWS" and insert -- BROWSING --
Drawing Sheet 6 of 7 - Fig. 6: Delete "PATCHE" and insert -- PATCH --

In the Claims
Column 9, Line 39: In Claim 2, delete "term," and insert -- term --
Column 9, line 41: In Claim 3, before "website" delete "resource"
Column 9, Line 54: In Claim 4, before "a" delete "the"
Column 10, Line 62: In Claim 14, after "term," insert -- and --
Column 11, Line 20: In Claim 19, delete "compromising:" and insert -- comprising: --
Column 12, Line 4: In Claim 20, after "system" delete "according to claim"

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,527,487 B2  
APPLICATION NO. : 12/619096  
DATED : September 3, 2013  
INVENTOR(S) : Changjian Hu et al.

Page 1 of 1

It is certified that error appears in the above-identified patent and that said Letters Patent is hereby corrected as shown below:

On the title page, in the illustrative figure " 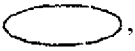 " should read -- 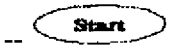 --

In the Drawings
Drawing Sheet 1 of 7 - Fig. 1: Delete "Nagative" and insert -- Negative --
Drawing Sheet 4 of 7 - Fig. 4: Delete " 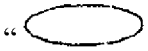 " and insert -- 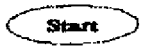 --
Drawing Sheet 6 of 7 - Fig. 6: Delete "SOFTWA" and insert -- SOFTWARE --
Drawing Sheet 6 of 7 - Fig. 6: Delete "BROWS" and insert -- BROWSING --
Drawing Sheet 6 of 7 - Fig. 6: Delete "PATCHE" and insert -- PATCH --

In the Claims
Column 9, Line 39: In Claim 2, delete "term," and insert -- term --
Column 9, line 41: In Claim 3, before "website" delete "resource"
Column 9, Line 54: In Claim 4, before "a" delete "the"
Column 10, Line 62: In Claim 14, after "term," insert -- and --
Column 11, Line 20: In Claim 19, delete "compromising:" and insert -- comprising: --
Column 12, Line 4: In Claim 20, after "system" delete "according to claim"

This certificate supersedes the Certificate of Correction issued November 11, 2014.

Signed and Sealed this  
Ninth Day of December, 2014

Michelle K. Lee  
*Deputy Director of the United States Patent and Trademark Office*